(12) United States Patent
Breternitz et al.

(10) Patent No.: US 10,198,349 B2
(45) Date of Patent: Feb. 5, 2019

(54) PROGRAMMING IN-MEMORY ACCELERATORS TO IMPROVE THE EFFICIENCY OF DATACENTER OPERATIONS

(71) Applicant: Advanced Micro Devices, Inc., Sunnyvale, CA (US)

(72) Inventors: Mauricio Breternitz, Austin, TX (US); Walter B. Benton, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 19 days.

(21) Appl. No.: 15/269,495

(22) Filed: Sep. 19, 2016

(65) Prior Publication Data
US 2018/0081583 A1 Mar. 22, 2018

(51) Int. Cl.
*G06F 12/00* (2006.01)
*G06F 17/00* (2006.01)
*G06F 9/30* (2018.01)
*G06F 13/00* (2006.01)
*G06F 13/28* (2006.01)

(52) U.S. Cl.
CPC ............... *G06F 12/00* (2013.01); *G06F 9/30* (2013.01); *G06F 17/00* (2013.01)

(58) Field of Classification Search
CPC ..... G06F 3/0638; G06F 3/0604; G06F 3/0683
See application file for complete search history.

(56) References Cited

U.S. PATENT DOCUMENTS

| 7,171,566 B2 * | 1/2007 | Durrant ............... G06F 12/1408 380/255 |
| 7,657,754 B2 * | 2/2010 | Chambers ............. G06F 12/145 711/163 |
| 2002/0051536 A1 * | 5/2002 | Shirakawa .............. G06F 21/71 380/45 |

(Continued)

OTHER PUBLICATIONS

Kanev et al. "Profiling a warehouse-scale computer", Proceedings of the 42nd Annual International Symposium on Computer Architecture, Jun. 13, 2015, 12 pages, ACM, New York, NY, USA.

(Continued)

*Primary Examiner* — Mark A Giardino, Jr.
(74) *Attorney, Agent, or Firm* — Meyertons Hood Kivlin Kowert and Goetzel PC; Rory D. Rankin

(57) ABSTRACT

Systems, apparatuses, and methods for utilizing in-memory accelerators to perform data conversion operations are disclosed. A system includes one or more main processors coupled to one or more memory modules. Each memory module includes one or more memory devices coupled to a processing in memory (PIM) device. The main processors are configured to generate an executable for a PIM device to accelerate data conversion tasks of data stored in the local memory devices. In one embodiment, the system detects a read request for data stored in a given memory module. In order to process the read request, the system determines that a conversion from a first format to a second format is required. In response to detecting the read request, the given memory module's PIM device performs the conversion of the data from the first format to the second format and then provides the data to a consumer application.

20 Claims, 9 Drawing Sheets

(56) References Cited

U.S. PATENT DOCUMENTS

| | | | |
|---|---|---|---|
| 2002/0184495 A1* | 12/2002 | Torii | G06F 21/608 |
| | | | 713/160 |
| 2003/0009543 A1* | 1/2003 | Gupta | H04L 41/0213 |
| | | | 709/223 |
| 2013/0022201 A1* | 1/2013 | Glew | G06F 21/72 |
| | | | 380/268 |
| 2014/0208041 A1* | 7/2014 | Hyde | G06F 12/0831 |
| | | | 711/146 |
| 2017/0201503 A1* | 7/2017 | Jayasena | H04L 63/0457 |
| 2017/0269865 A1* | 9/2017 | Willcock | H04N 19/186 |

OTHER PUBLICATIONS

Loh, et al. "A Processing-in-Memory Taxonomy and a Case for Studying Fixed-function PIM", Workshop on Near-Data Processing, Dec. 8, 2013, pp. 1-4.

\* cited by examiner

PROGRAMMING IN-MEMORY ACCELERATORS TO IMPROVE THE EFFICIENCY OF DATACENTER OPERATIONS

BACKGROUND

Description of the Related Art

Serialization is the process of translating data structures into a format that can be easily stored or transmitted. For example, a first application can utilize and store a dataset in a first format. Then, the dataset can be sent to a second application which expects to utilize the dataset in a second format. The second application should be able to reliably reconstruct the serialized data stream sent by the first application. As used herein, the term "dataset" is defined as a collection of data. The collection of data can include any number of data elements structured in any of various different manners. It is noted that the term "dataset" can also be referred to as a "data object".

Data that is shared between applications can be defined by a schema. For example, an interface description language (IDL) can be used to define how data is used by a software application's application programming interface (API). IDLs describe an interface in a language-independent manner, allowing software applications to communicate even if they utilize different languages. Various types of serialization representations can be used by different types of computing systems. For example, in one embodiment, JavaScript Object Notation (JSON) can be used as the serialization format to encode a dataset. The JSON format is text-based and convenient for using with a language like JavaScript. In another embodiment, Protocol Buffers can be used as the serialization format to encode a dataset. Protocol Buffers is a way of encoding structured data in an efficient yet extensible format. In a further embodiment, Extensible Markup Language (XML) can be utilized to define a set of rules for encoding data in a format that is human and machine readable. In other embodiments, other formats or combinations of the previously listed formats can be utilized.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for generating executable binaries targeting in-memory accelerators for transforming formats of datasets are disclosed herein. In one embodiment, a system includes at least one or more processors coupled to a memory module. The memory module includes one or more memory devices coupled to a processing in memory (PIM) device integrated directly with memory. In some embodiments, the memory module includes a processing unit on a logic chip which is 3D-stacked under one or more memory chips. For example, a silicon die can be stacked with one or more memory layers. In some cases, the processing unit integrated with the memory chips is a fully-programmable processor.

In one embodiment, the system is configured to detect a read request targeting a first dataset stored in a first format, wherein the read request is generated by a consumer application. In response to detecting the read request, the system can determine whether the consumer application operates on data in a different format than the first format. If the system determines that the consumer application expects data to be in a second format, then the one or more processors can generate instructions which are executable by the PIM device to convert the first dataset to the second format. In one embodiment, the first format is defined by a first interface description language (IDL) and the second format is defined by a second IDL.

Then, after the executable instructions are generated, the executable instructions are conveyed from the one or more processors to the PIM device. The PIM device is configured to execute the instructions to convert the first dataset from the first format to the second format. Converting the first dataset from the first format to the second format includes one or more of compression, decompression, encryption, decryption, and permutation. Then, the first dataset in the second format is conveyed to the consumer application.

Figure 1:
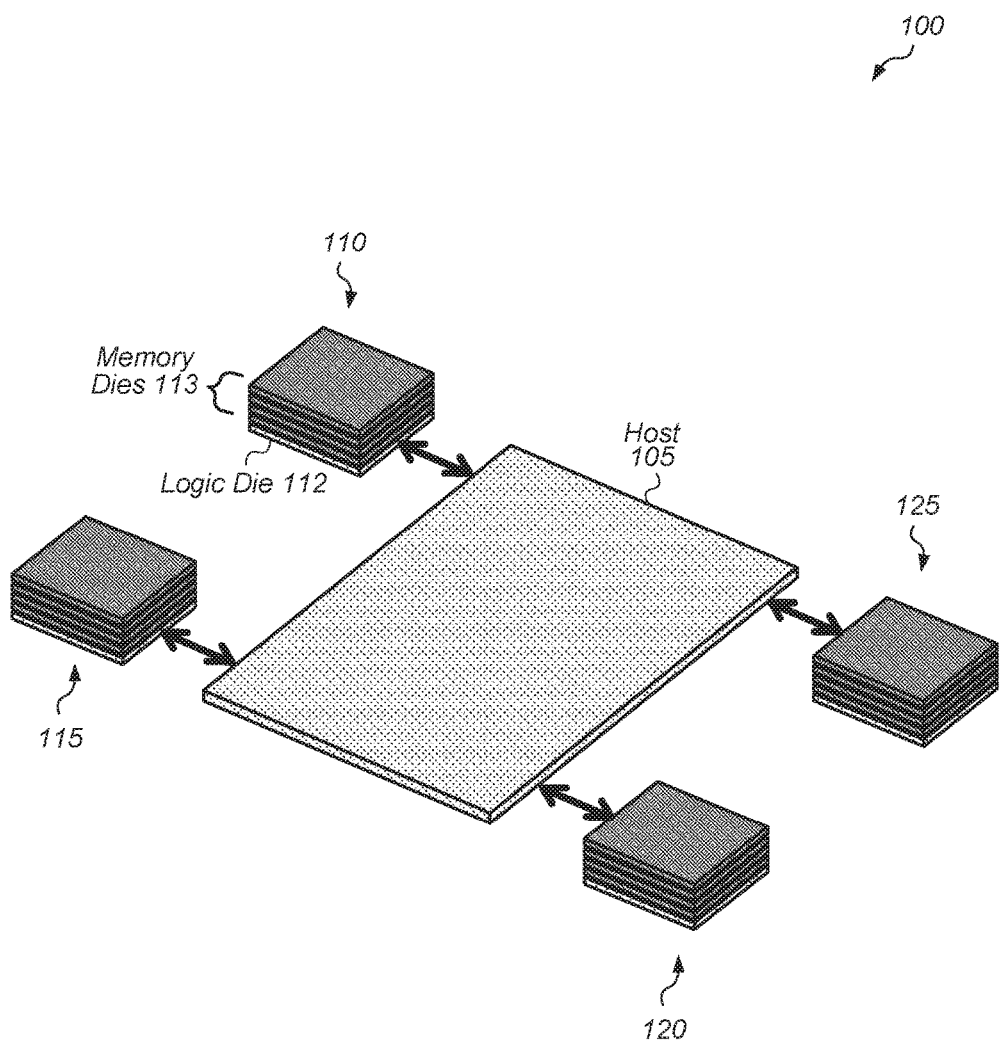
FIG. 1 is a block diagram of one embodiment of a system.

Referring now to FIG. 1, a block diagram of one embodiment of a system 100 is shown. Host 105 is representative of any number and type of processors. For example, host 105 can include one or more processors (e.g., central processing unit (CPU), graphics processing unit (GPU), accelerated processing unit (APU), field-programmable gate array (FPGA)) that perform computations and issue memory requests to the memory modules 110, 115, 120, and 125. In one embodiment, the one or more processors of host 105 can execute the main control software of system 100, such as an operating system. Generally, software executed by the one or more processors of host 105 during use can control the other components of system 100 to realize the desired functionality of system 100. The one or more processors of host 105 can also execute other software, such as application programs. The application programs can provide user functionality, and may rely on the operating system for lower level device control.

Host 105 is coupled to memory modules 110, 115, 120, and 125 using any of various types of interconnect protocols. Each memory module can include one or more memory dies and one or more logic dies with built-in computation capabilities provided by an in-memory accelerator. The "in-memory accelerator" can also be referred to as a "processing in memory (PIM) device". Each memory module can be implemented with a PIM architecture, which is a concept of adding computational capabilities near memory. The benefits of this architecture include reduced latency and energy consumption associated with data movement between the processing device and the memory hierarchy. For example, the computation capabilities of memory module 110 can be implemented on a separate logic die 112 which is vertically stacked with the memory die(s) 113. Each of the other memory modules 115, 120, and 125 can be similarly constructed. However, the methods and mechanisms described herein are also applicable to cases where the near memory computation capabilities are implemented directly on the memory dies. Still further, the methods and mechanisms described herein are also applicable in other system configurations that consist of multiple host processors and memory modules interconnected in various configurations.

Memory die(s) 113 include stacked memory devices implementing memory circuitry, such as dynamic random-access memory (DRAM), static random-access memory (SRAM), read-only memory (ROM), and the like. Logic die 112 can implement hard-wired logic and routing logic for accessing the memory circuitry of the stacked memory die(s) 113. Each memory module can be fabricated using any of a variety of 3D integrated circuit fabrication processes. In one embodiment, logic die 112 and memory die(s) 113 can be implemented as separate substrates (e.g., bulk silicon) with active devices and one or more metal routing layers formed at an active surface. This approach can include a wafer-on-wafer process whereby a wafer comprising a matrix of die is fabricated and thinned, and through-silicon vias (TSVs) are etched through the bulk silicon. Multiple wafers are then stacked to achieve the illustrated layer configuration (e.g., a stack of four wafers comprising memory circuitry die for the four memory layers and a wafer comprising the logic die for the processor layer), aligned, and then joined via thermocompression. The resulting stacked wafer set is singulated to separate the individual 3D IC device. In other embodiments, other techniques for fabricating memory modules can be utilized.

In one embodiment, logic die 112 can include a DRAM memory controller which is coupled to the stacked memory die(s) 113 via TSVs. The memory controller can be configured to perform memory accesses to the data stored in the storage cell circuitry of the stacked DRAM memory devices in response to memory access requests from one or more processor cores or processing elements on logic die 112.

System 100 can correspond to any of various types of computer systems or computing devices, including, but not limited to, a personal computer system, desktop computer, laptop or notebook computer, supercomputer, tablet, phone, smartphone, mainframe computer system, handheld computer, workstation, network computer, a consumer device, server, file server, application server, storage server, or in general any type of computing system or device.

Figure 2:
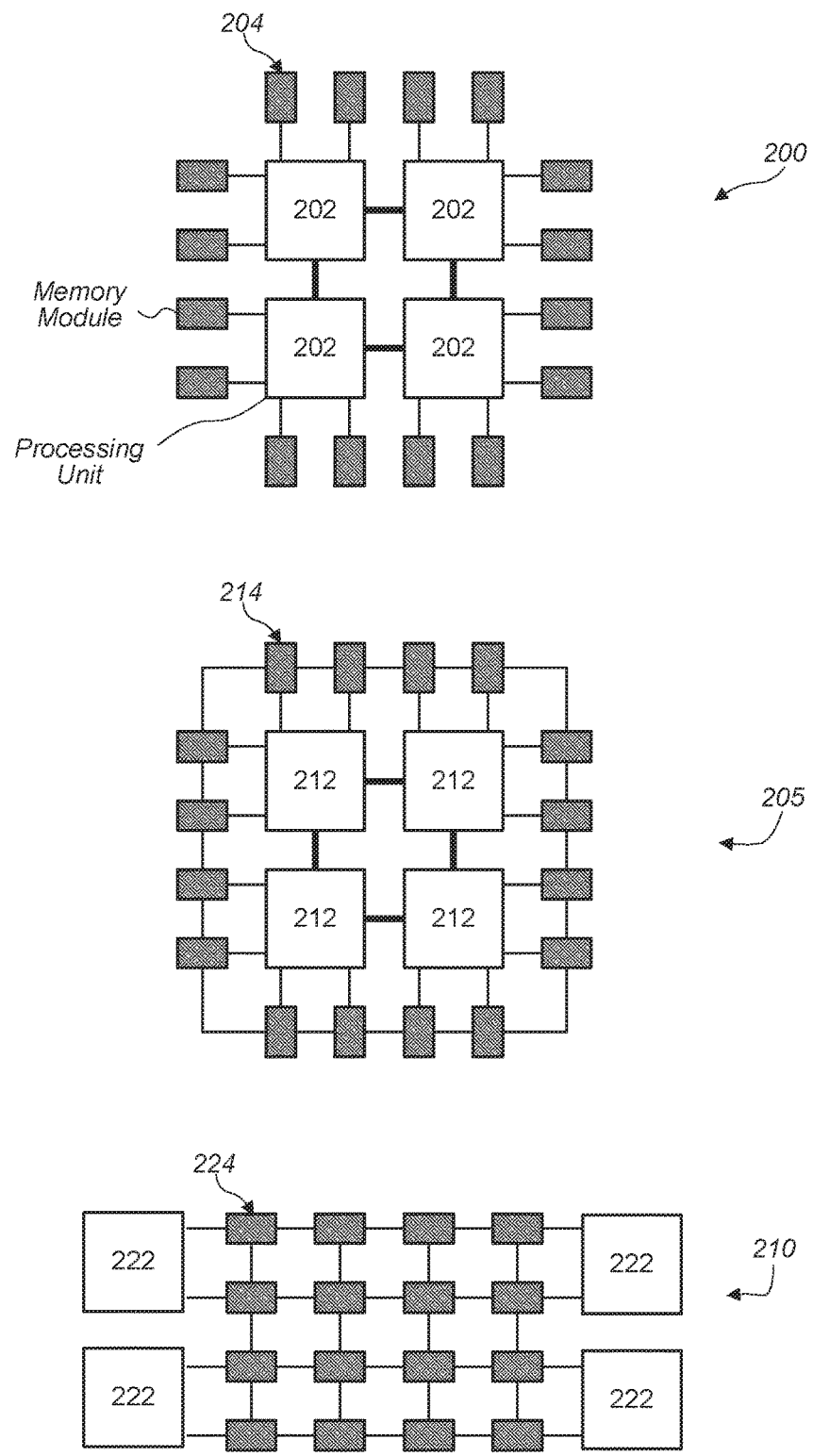
FIG. 2 includes block diagrams of various system configurations.

Turning now to FIG. 2, block diagrams of various system configurations are shown. In the system configuration 200, the four large squares in the center of the configuration 200 represent host processing units 202. The 16 smaller rectangles on the outside of configuration 200 represent memory devices or memory modules 204. Each memory module can include processing capabilities on a logic die separate from one or more memory die. System configuration 200 is an alternate configuration, as compared to system 100 (of FIG. 1), for implementing the methods and mechanisms described herein.

System configuration 205 illustrates another configuration which utilizes the methods and mechanisms described herein. System configuration 205 has connections between all of the memory modules 214 on the outside of the configuration 205 to allow data to be sent back and forth directly between memory modules without passing through the processing units 212. Still further, system configuration 210 shows another configuration which utilizes the methods and mechanisms described herein. System configuration 210 has the memory modules 224 in the center of configuration 210 and the processing units 222 on the edges of configuration 210. It should be understood that other configurations, in addition to those shown in FIG. 2, for utilizing the methods and mechanisms described herein are possible and contemplated.

Figure 3:
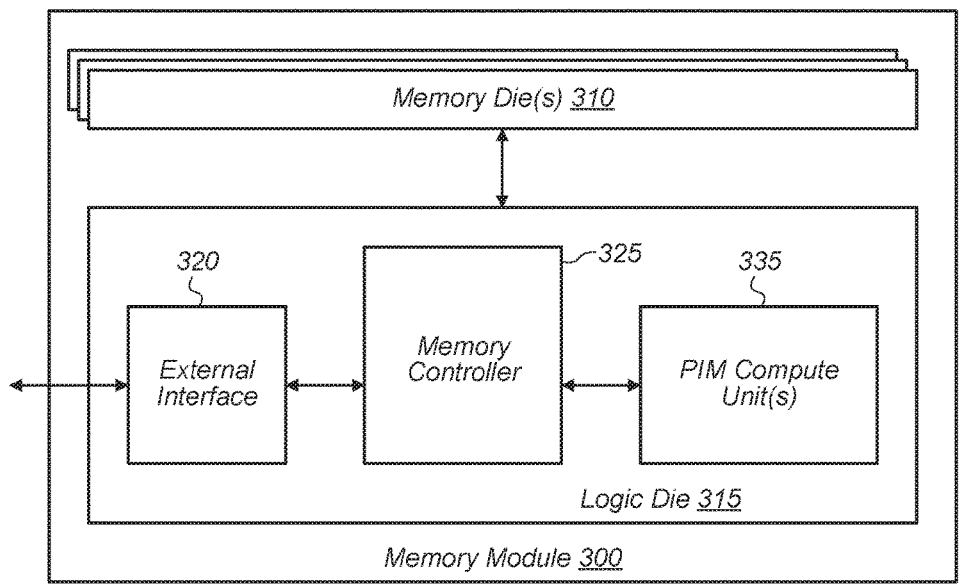
FIG. 3 is a block diagram of one embodiment of a memory module.

Referring now to FIG. 3, a block diagram of one embodiment of a memory module 300 is shown. In one embodiment, memory module 300 includes memory die(s) 310 and logic die 315. In one embodiment, the memory die(s) 310 are implemented with dynamic random access memory (DRAM) devices. Logic die 315 includes external interface 320, memory controller 325, and processing in memory (PIM) compute unit(s) 335.

Generally speaking, memory controller 325 includes at least a first interface which is coupled to one or more processors (e.g., PIM compute unit(s) 335, external processor(s)). It is noted that there can be one or more intervening components between memory controller 325 and the one or more processors on the first interface. Memory controller 325 also includes multiple interfaces to local processors and to remote processors. Memory controller 325 also includes at least a second interface which is coupled to one or more memory devices (e.g., memory die(s) 310).

Figure 4:
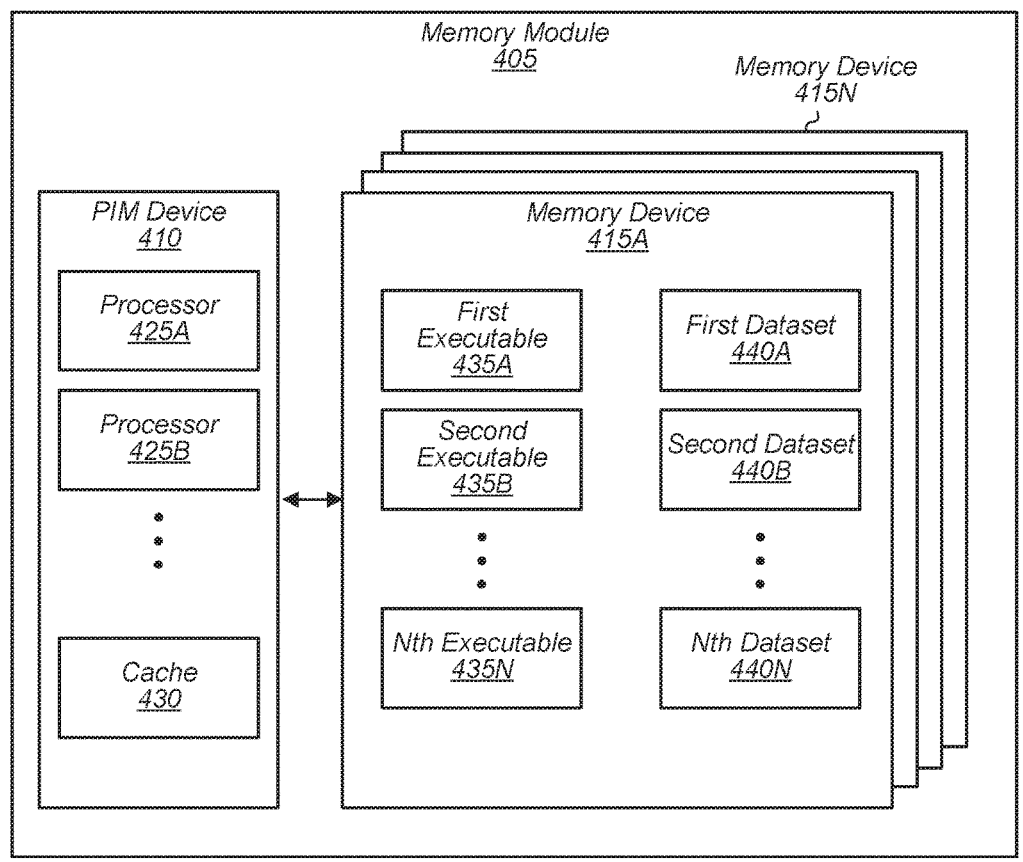
FIG. 4 is a block diagram of another embodiment of a memory module.

Turning now to FIG. 4, a block diagram of another embodiment of a memory module 405 is shown. Memory module 405 includes processing-in-memory (PIM) device 410 and memory device(s) 415A-N. In one embodiment, memory module 405 is implemented as a stack of die with PIM device 410 and each of memory device(s) 415A-N a separate die in the stack. In other embodiments, memory module 405 can be implemented using other arrangements of components.

Memory device(s) 415A-N are representative of any number and type of memory devices that can be included within memory module 405. In one embodiment, the memory device(s) 415A-N are implemented with dynamic random access memory (DRAM) devices. In one embodiment, PIM device 410 includes processors 425A-B and cache 430. It is noted that PIM device 410 can also include one or more other components. Processors 425A-B include any number and type of processors for executing instructions, manipulating data, and converting data from a first format to a second format. In one embodiment, processors 425A-B are dedicated processors (e.g., CPUs, GPUs). In another embodiment, processors 425A-B are programmable devices (e.g., FPGAs) with a computation substrate which is programmable. In this embodiment, the data width of the computation substrate can be reprogrammed to match the data width of a particular format of a dataset being processed. In various embodiments, the set of operations performed by processors 425A-B can include operations used in data conversion such as compression, decompression, encryption, decryption, permutation, etc.

Memory devices 415A-N are configured to store data including executables 435A-N and datasets 440A-N. Each of executables 435A-N is an executable binary generated by a compiler and is conveyed to memory module 405 to be executed by processors 425A-B. Each executable 435A-N includes a plurality of executable instructions configured to convert a dataset from one format to another format. A format of a dataset can specify one or more fields for storing data of the dataset. For example, first executable 435A is executable by processors 425A-B to convert a dataset from a first format to a second format, second executable 435B is executable by processors 425A-B to convert a dataset from a third format to a fourth format, and so on.

In one embodiment, when PIM device 410 receives a request to transform a given dataset, the request indicates which executable to utilize to perform the transformation. The request can also include a source address of the source dataset and a destination address for storing the transformed dataset. In one embodiment, the request also identifies the source format and the destination format. In another embodiment, the executable specified by the request is designed to modify a first format into a second format, and so specifying the executable provides an indication of the source and destination formats.

First dataset 440A, second dataset 440B, and Nth dataset 440N are representative of any number and type of datasets which can be stored in memory devices 415A-N. Each dataset can be stored in any type of format, with potentially many different types of formats being used for the datasets stored in memory devices 415A-N. In some cases, the same dataset can be stored multiple times in memory device 415A in different formats. For example, first dataset 440A can be a first dataset stored according to a first format. Then, one of the executables 435A-N can be used to convert first dataset 440A into second dataset, which is the first dataset in a second format. In some cases, the original dataset in the original format can be deleted after the conversion takes place. In other cases, both the original dataset and converted dataset can remain in memory devices 415A-N.

In one embodiment, a converted dataset can be conveyed to another memory module, node, or computing system from memory module 405 after being converted. For example, another application executing on a different computing system can request first dataset 440A. However, this application can request first dataset 440A but in a different format than the current format of first dataset 440A. Accordingly, in response to detecting the request, PIM device 410 can convert first dataset 440A into the requested format using the appropriate executable of executables 435A-N. Then, the converted dataset in the requested format can be conveyed to the requesting application.

If a particular executable is not included within executables 435A-N for performing a desired conversion, then PIM device 410 can request that a main processor generate the desired executable. Accordingly, the main processor can execute a compiler to generate an executable for converting a dataset from a first format to a specified format needed by the requesting application. This executable can be utilized by PIM device 410 to perform the conversion. Then, the executable can be stored on one of memory devices 415A-N and the executable can be used to perform future conversions.

Figure 5:
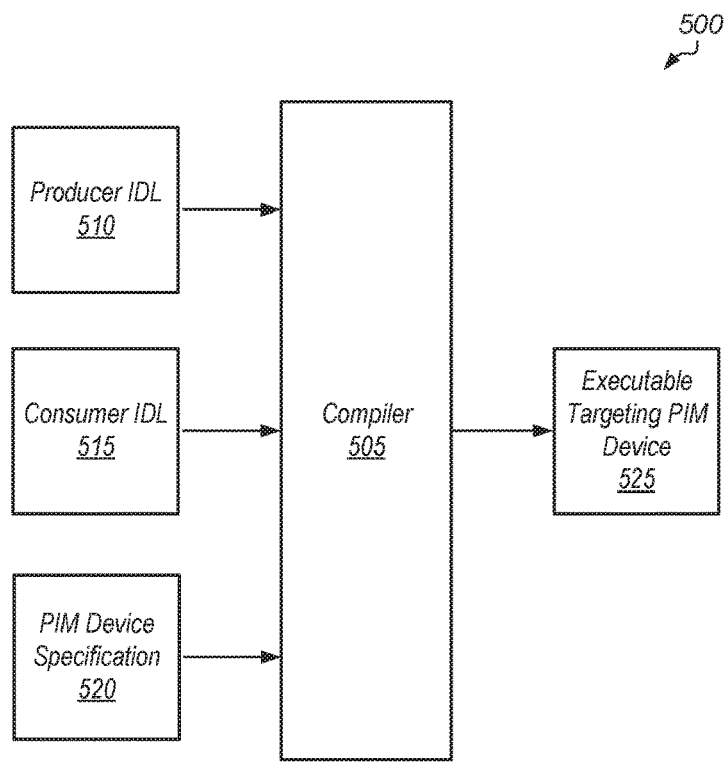
FIG. 5 is a block diagram of one embodiment of a system.

Referring now to FIG. 5, a block diagram of one embodiment of a system 500 for compiling executables targeting a PIM device is shown. System 500 includes compiler 505 for compiling an executable for a target PIM device (not shown). The inputs to compiler 505 include a producer IDL 510, a consumer IDL 515, and a PIM device specification 520. Compiler 505 utilizes these inputs to generate an executable 525 that converts a dataset stored in a first format defined by producer IDL 510 into a second format defined by consumer IDL 515. The executable 525 is targeted to and executable by a PIM device which is defined by the PIM device specification 520.

It is noted that compiler 505 can be configured to generate executables for many different types of PIM devices depending on the PIM device specification 520 provided to compiler 505. Accordingly, a first executable generated for a first type of PIM device can be different from a second executable generated for a second type of PIM device even if the producer IDL 510 and consumer IDL 515 are the same for both types of PIM devices. In another embodiment, different compilers can be utilized to generate executables for different PIM devices.

Figure 6:
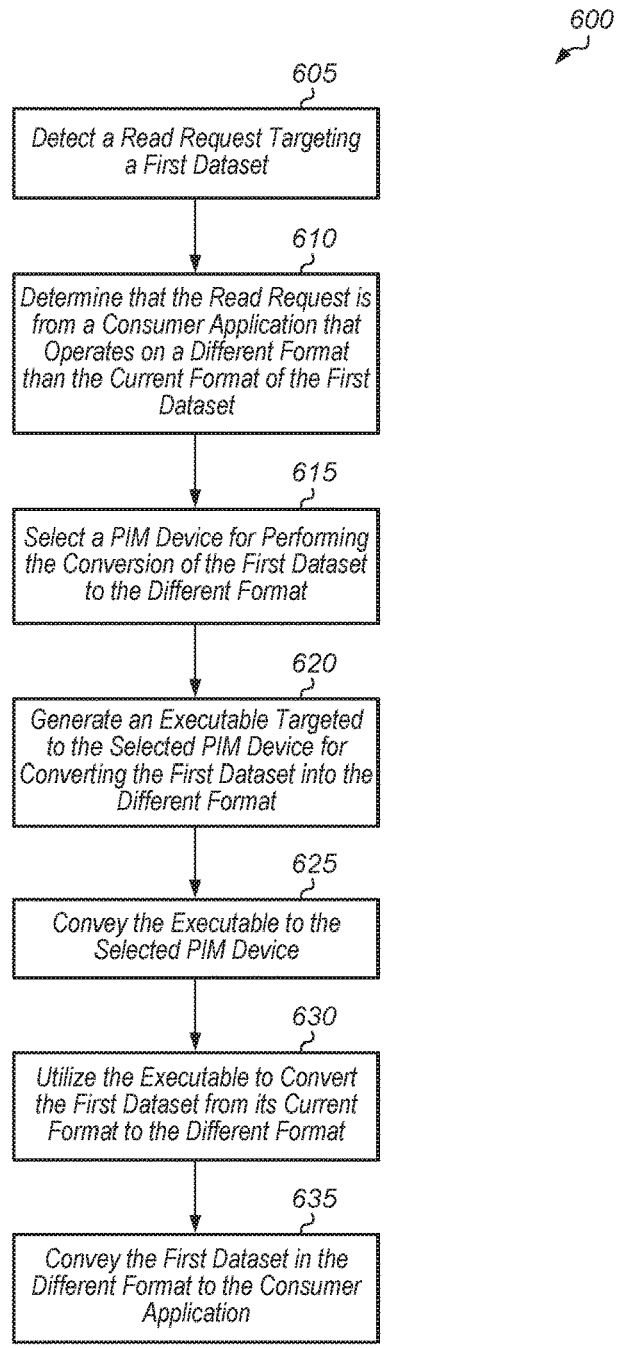
FIG. 6 is a generalized flow diagram illustrating one embodiment of a method for utilizing a PIM device to convert the format of a dataset.
Figure 7:
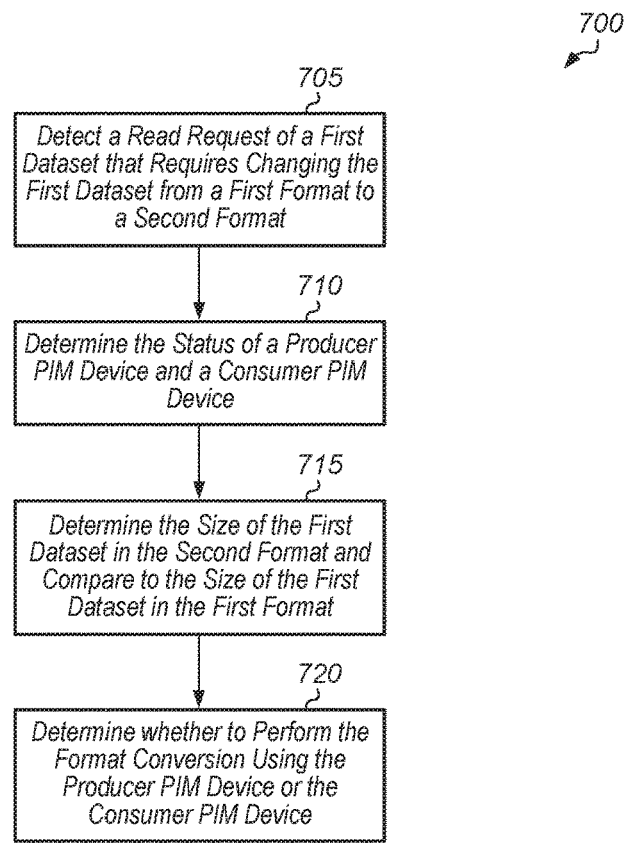
FIG. 7 is a generalized flow diagram illustrating one embodiment of a method for determining which PIM device to select for performing data format conversion.
Figure 8:
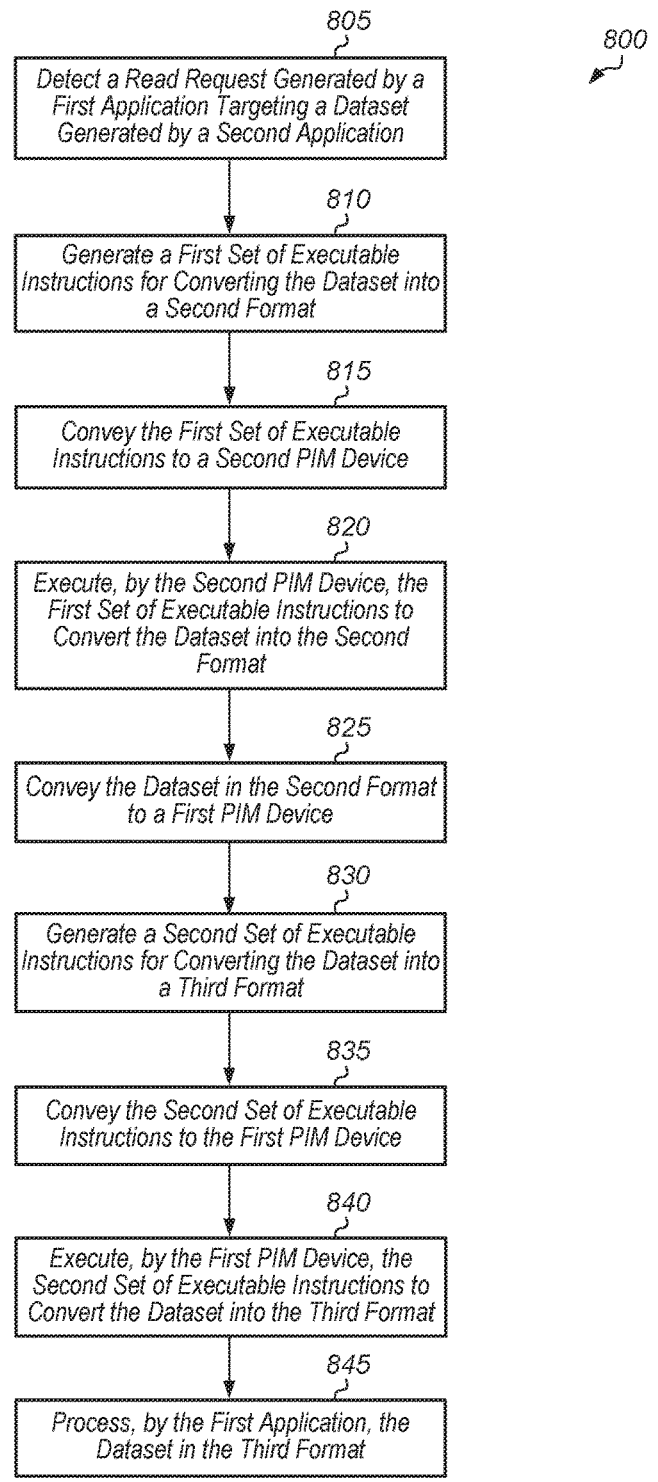
FIG. 8 is a generalized flow diagram illustrating one embodiment of a method for transforming the format of a dataset.
Figure 9:
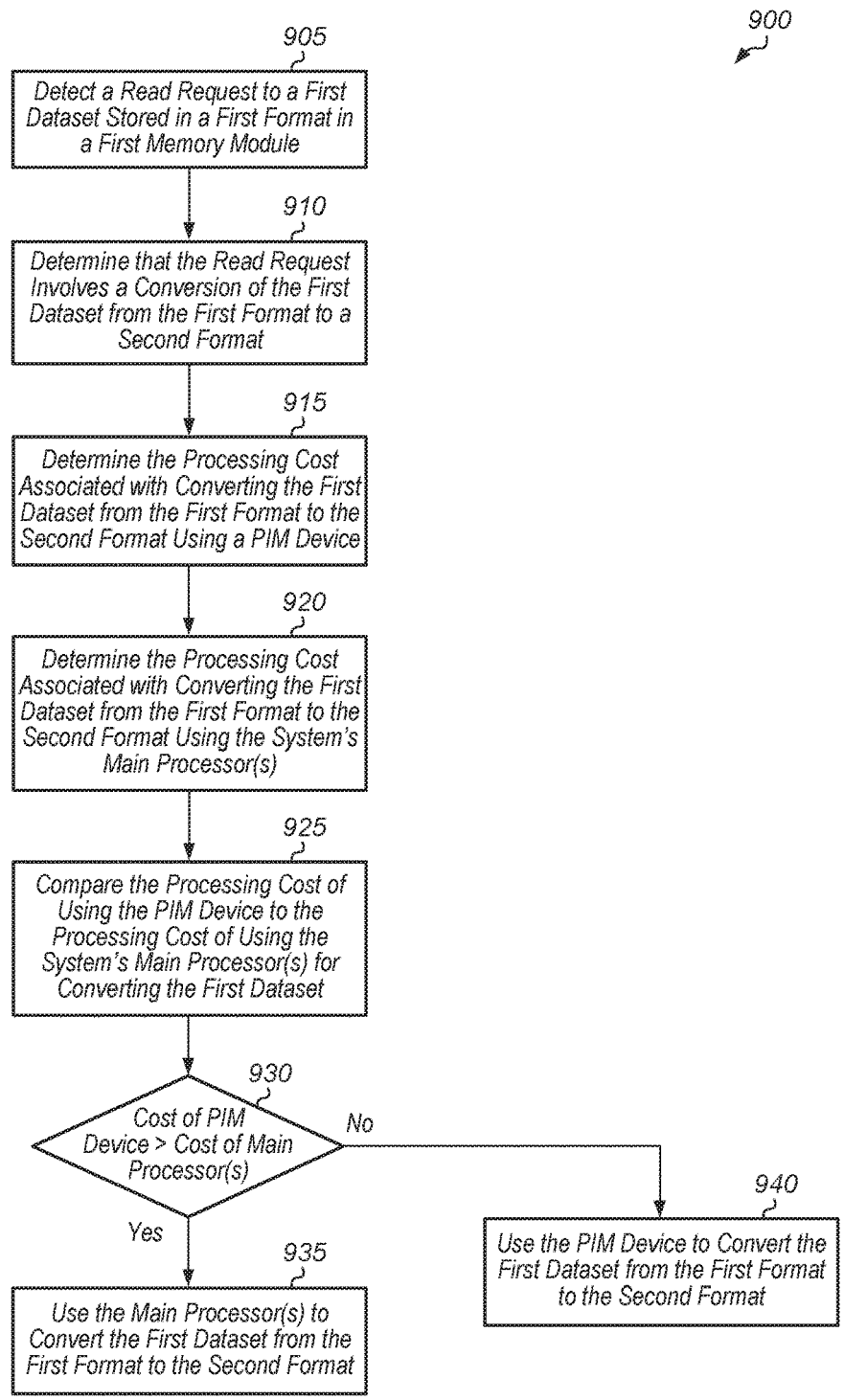
FIG. 9 is a generalized flow diagram illustrating one embodiment of a method for determining how to convert the format of a dataset.

Referring now to FIG. 6, one embodiment of a method 600 for utilizing a PIM device to convert the format of a dataset is shown. For purposes of discussion, the steps in this embodiment and those of FIGS. 7-9 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 600.

A processor detects a read request targeting a first dataset (block 605). Next, the processor determines that the read request is from a consumer application that operates on a different format than the current format of the first dataset (block 610). Then, the processor selects a PIM device for performing the conversion of the first dataset to the different format (block 615). Next, the processor generates an executable targeted to the selected PIM device for converting the first dataset to the different format (block 620). Then, the processor conveys the executable to the selected PIM device (block 625).

The selected PIM device utilizes the executable to convert the first dataset from its current format to the different format (block 630). Then, the PIM device conveys the first dataset in the different format to the consumer application (block 635). Alternatively, the PIM device can store the first dataset in the different format in memory, and the consumer application can retrieve the first dataset from memory. After block 635, method 600 ends.

Referring now to FIG. 7, one embodiment of a method 700 for determining which PIM device to select for performing data format conversion is shown. In the example shown, a system detects a read request of a first dataset that requires changing the first dataset from a first format to a second format (block 705). Then, the system determines the status of a producer PIM device and a consumer PIM device (block 710). The producer PIM device refers to the PIM device which is coupled to the memory where the first dataset is currently stored. The consumer PIM device refers to the PIM device which is coupled to the memory where the first dataset will be sent and stored to be utilized by a consumer application. Determining the status of the producer PIM device and the consumer PIM device can involve detecting if either PIM device has the correct executable for converting the first dataset from the first format to the second format. Determining the status of the producer PIM device and the consumer PIM device can also involve determining how many tasks each PIM device is waiting to perform. Additionally, determining the status of the producer PIM device and the consumer PIM device can also involve predicting how long it will take each PIM device to perform the conversion of the first dataset from the first format to the second format.

Also, the system may determine the size of the first dataset in the second format and compare to the size of the first dataset in the first format (block 715). For example, if the size of the first dataset in the first format is smaller than the size of the first dataset in the second format, it can be preferable to send the first dataset in the first format to minimize the amount of data sent from the producer application to the consumer application. Then, based on these determinations, the system determines whether to perform the format conversion using the producer PIM device or the consumer PIM device (block 720). After block 720, method 700 ends.

For example, depending on different system priorities when transferring the first dataset from the producer application to the consumer application, the system decides which PIM device to use for converting the first dataset. For example, if communication bandwidth is the most important factor, then the system can determine which format compresses the first dataset more efficiently. For example, if the first dataset is smaller when encoded using the first format, then the system can send the first dataset in the first format to the consumer memory module and then have the consumer PIM device perform the conversion to the second format. Otherwise, if the first dataset is smaller when encoded using the second format, then the system can have the producer PIM device perform the conversion to the second format and then the first dataset can be sent in the second format to the consumer memory module.

In another embodiment, latency can be the most important factor. In this embodiment, the system can determine if the executable usable for enabling a PIM device to perform the conversion from the first format to the second format is already available on the producer PIM device or the consumer PIM device. The system can also determine if there are any pending processing tasks that will be performed by the producer PIM device or the consumer PIM device prior to performing the conversion of the first dataset. Then, based on these factors, the system can decide which PIM device to select for performing the conversion based on how long it is expected each PIM device to take to perform the conversion. The system can then select the PIM device which is predicted to take less time to perform the conversion. In a further embodiment, the system can take into account multiple factors when determining which PIM device to select for performing the conversion of the first dataset from the first format to the second format.

Turning now to FIG. 8, one embodiment of a method 800 for transforming the format of a dataset is shown. In the example shown, a system detects a read request generated by a first application targeting a dataset generated by a second application (block 805). It can be assumed for the purposes of this discussion that the dataset is stored in a first format. It can also be assumed for the purposes of this discussion that the first application is executing on processing hardware which is coupled to a first memory module, with the first memory module containing a first PIM device. It can also be assumed for the purposes of this discussion that the second application is executing on processing hardware which is coupled to a second memory module, with the second memory module containing a second PIM device. In response to detecting said read request, the system generates a first set of executable instructions for converting the dataset from the first format into a second format suitable for transmission to the first application (block 810). Then, the system conveys the first set of executable instructions to the second PIM device (block 815). Next, the second PIM device executes the first set of executable instructions to convert the dataset into the second format (block 820). Then, the dataset in the second format is conveyed to the first PIM device to be used by the first application (block 825).

Additionally, in response to detecting said request, the first processor generates a second set of executable instructions for converting the dataset from the second format into a third format usable by the first application (block 830). Then, the first processor conveys the second set of executable instructions to the first PIM device (block 835). Next, the first PIM device executes the second set of executable instructions to convert the dataset into the third format usable by the first application (block 840). Then, the dataset in the third format is processed by the first application (block 845). After block 845, method 800 ends.

Referring now to FIG. 9, one embodiment of a method 900 for determining how to convert the format of a dataset is shown. In the example shown, a system detects a read request to a first dataset stored in a first format in a first memory module (block 905). The memory module includes one or more memory devices and a PIM device. The system also determines that the read request will involve a conversion of the first dataset from the first format to a second format (block 910). For example, the read request can be generated by an application which operates on data in a second format which is different from the first format.

Next, the system can determine the processing cost associated with converting the first dataset from the first format to the second format using the PIM device (block 915). Determining the processing cost can include adding together a prediction of the cost (e.g., latency, power consumption) of each task of the tasks required to convert the first dataset from the first format to the second format using the PIM device. The tasks can include generating an executable to execute on the PIM device, sending the executable to the PIM device, executing the executable on the PIM device, conveying the first dataset in the second format to the destination memory locations, and/or one or more other tasks.

Also, the system can determine the processing cost associated with converting the first dataset from the first format to the second format using the system's main processor(s) (block 920). Determining the processing cost can include adding together a prediction of the cost of each task of the tasks required to convert the first dataset from the first format to the second format using the system's main processor(s). The tasks can include retrieving the first dataset from the memory module, executing instructions on the system's main processor(s) for converting the first dataset from the first format to the second format, conveying the first dataset in the second format to the destination memory locations, and/or one or more other tasks.

Next, the system compares the processing cost of using the PIM device to the processing cost of using the system's main processor(s) for converting the first dataset from the first format to the second format (block 925). In another embodiment, the system can compare the processing cost of using the PIM device for converting the first dataset from the first format to the second format to a programmable threshold in block 925. If the processing cost of using the PIM device are greater than the processing cost of using the system's main processor(s) (conditional block 930, "yes" leg), then the system uses the main processor(s) for converting the first dataset from the first format to the second format (block 935). Otherwise, if the processing cost of using the PIM device are less than the processing cost of using the system's main processor(s) (conditional block 930, "no" leg), then the system uses the PIM device for converting the first dataset from the first format to the second format (block 940). It is noted that if the processing cost of using the PIM device are the same as the processing cost of using the system's main processor(s), then the system can choose to use either approach, can choose randomly between the two approaches, or the system can utilize one or more additional factors for determining which approach to utilize for converting the first dataset from the first format to the second format. After blocks 935 and 940, method 900 ends.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
    a memory module comprising:
        one or more memory devices;
        a processing in memory (PIM) device coupled to the one or more memory devices; and
    one or more processors coupled to the memory module;
    wherein the system is configured to:
        detect a read request targeting a first dataset stored in a first format, wherein the read request is generated by a consumer application;
        in response to determining that the consumer application operates on data in a second format different from the first format of the first dataset:
            determine if the one or more memory devices currently store executable instructions configured to convert data from the first format to the second format;
            in response to determining the one or more memory devices do not currently store executable instructions configured to convert data from the first format to the second format, cause the one or more processors to execute a compiler to generate instructions which are executable by the PIM device for converting the first dataset from the first format to the second format.

2. The system as recited in claim 1, wherein the system is further configured to convey the instructions from the one or more processors to the PIM device.

3. The system as recited in claim 2, wherein the PIM device is configured to execute the instructions to convert the first dataset from the first format to the second format.

4. The system as recited in claim 3, wherein converting the first dataset from the first format to the second format comprises one or more of compression, decompression, encryption, decryption, and permutation.

5. The system as recited in claim 1, wherein the first dataset is stored in the one or more memory devices of the memory module.

6. The system as recited in claim 1, wherein the system is further configured to convey the first dataset in the second format to the consumer application.

7. The system as recited in claim 1, wherein the first format is defined by a first interface description language (IDL), and wherein the second format is defined by a second IDL.

8. A method comprising:
    detecting a read request targeting a first dataset stored in a first format, wherein the read request is generated by a consumer application;
    in response to determining that the consumer application operates on data in a second format different from the first format of the first dataset:
        determine if the one or more memory devices currently store executable instructions configured to convert data from the first format to the second format;
        in response to determining the one or more memory devices do not currently store executable instructions configured to convert data from the first format to the second format, cause the one or more processors to execute a compiler to generate instructions which are executable by a processing in memory (PIM) device for converting the first dataset from the first format to the second format.

9. The method as recited in claim 8, further comprising conveying the instructions from the one or more processors to the PIM device.

10. The method as recited in claim 9, further comprising executing, by the PIM device, the instructions to convert the first dataset from the first format to the second format.

11. The method as recited in claim 10, converting the first dataset from the first format to the second format comprises one or more of compression, decompression, encryption, decryption, and permutation.

12. The method as recited in claim 8, wherein the first dataset is stored in one or more memory devices of a memory module.

13. The method as recited in claim 8, further comprising conveying the first dataset in the second format to the consumer application.

14. The method as recited in claim 8, wherein the first format is defined by a first interface description language (IDL), and wherein the second format is defined by a second IDL.

15. A non-transitory computer readable storage medium storing program instructions, wherein the program instructions are executable by a processor to:
    detect a read request targeting a first dataset stored in a first format, wherein the read request is generated by a consumer application;
    in response to determining that the consumer application operates on data in a second format different from the first format of the first dataset:

determine if the one or more memory devices currently store executable instructions configured to convert data from the first format to the second format;

in response to determining the one or more memory devices do not currently store executable instructions configured to convert data from the first format to the second format, cause the one or more processors to execute a compiler to generate instructions which are executable by a processing in memory (PIM) device for converting the first dataset from the first format to the second format.

16. The non-transitory computer readable storage medium as recited in claim 15, wherein the program instructions are further executable by the processor to convey the instructions from the processor to the PIM device.

17. The non-transitory computer readable storage medium as recited in claim 16, wherein the program instructions are further executable by the PIM device to convert the first dataset from the first format to the second format.

18. The non-transitory computer readable storage medium as recited in claim 17, wherein converting the first dataset from the first format to the second format comprises one or more of compression, decompression, encryption, decryption, and permutation.

19. The non-transitory computer readable storage medium as recited in claim 15, wherein the first dataset is stored in the one or more memory devices of the memory module.

20. The non-transitory computer readable storage medium as recited in claim 15, wherein the program instructions are further executable by the processor to convey the first dataset in the second format to the consumer application.

* * * * *